United States Patent [19]
Cassens, Jr.

[11] 3,879,208
[45] Apr. 22, 1975

[54] REFRACTORY COMPOSITION
[75] Inventor: Nicholas Cassens, Jr., Pleasanton, Calif.
[73] Assignee: Kaiser Aluminum & Chemical Corporation, Oakland, Calif.
[22] Filed: Feb. 19, 1974
[21] Appl. No.: 443,579

[52] U.S. Cl. .................. 106/58; 106/59; 106/62
[51] Int. Cl. ............................................ C04b 35/04
[58] Field of Search ................ 106/58, 59, 62, 105

[56] References Cited
UNITED STATES PATENTS

| | | | |
|---|---|---|---|
| 833,930 | 10/1906 | Jeroch | 106/105 |
| 1,916,971 | 7/1933 | Denning | 106/58 |
| 3,030,217 | 4/1962 | Chantler et al. | 106/59 |
| 3,333,972 | 8/1967 | Elmer et al. | 106/58 |
| 3,360,388 | 12/1967 | Neely | 106/58 |

Primary Examiner—J. Poer
Attorney, Agent, or Firm—Paul E. Calrow; Malcolm McQuarrie

[57] ABSTRACT

A refractory composition suitable for forming a monolithic structure by ramming, gunning, or casting is made from sized refractory aggregate, preferably non-acid aggregate, containing at least 10% grain with an MgO content of at least 50% and passing a 100 mesh screen, together with aluminum sulfate, an organic acid or salt thereof, for example citric acid or a citrate, with or without the addition of a boron compound, preferably a soluble boron compound such as borax or boric acid.

23 Claims, No Drawings

REFRACTORY COMPOSITION

BACKGROUND OF THE INVENTION

This invention concerns refractory compositions, and particularly such compositions suitable for forming by ramming, casting, or gunning.

Granular refractory compositions suitable for forming monolithic structures by ramming, casting, or gunning are well known. One problem with such compositions arises from the fact that they are formed in place in the furnace or other structure where they are used, and are fired only by heating of the furnace or other structure. Accordingly, in the first instance they must have sufficient bonding strength to set at or near room temperature. In other words, they must have what is know in the industry as a cold setting bond. After the structure is heated up to operating temperature, a ceramic bond, due either to sintering or to liquid formation, forms. However, with many compositions there is an intermediate temperature, for example in the range from 800° to 1,200°C, where the structure is relatively weak because the room temperature bond, which is often a hydrated substance or an organic material, has decomposed, but the ceramic bond has not yet formed.

Another problem with granular refractory compositions which are formed in place is achieving adequate density. While it is relatively easy to obtain high densities in brick or other shapes which are formed at high pressures, for example in a press, obtaining high densities by ramming, and particularly by casting, is more difficult.

In addition to achieving adequate density and intermediate temperature strength, the other properties of a refractory material, such as strength at high temperatures, refractoriness, low porosity, etc., must also be maintained.

A prior art composition which has been very successful commercially and which combines high density and good intermediate temperature strength is bonded with a soluble chromium compound such as chromic acid or a chromate, together with a boron compound such as boric acid, as set forth in U.S. Pat. No. 2,702,751. However, the use of materials such as chromic acid requires care in the manufacture and use of this composition because of the potential hazards of chromic acid. Accordingly, there has been a desire to achieve the same good properties in a composition using less hazardous bonding materials.

It is known to use aluminum sulfate as a binder for refractory materials, including such nonacid materials as magnesite and chrome ore, for example as set forth in U.S. Pat. No. 976,996.

It is also known to add citric acid to magnesia containing compositions bonded with magnesium sulfate, for example as set forth in U.S. Pat. Nos. 1,916,971 and 3,333,972. This latter patent discloses the use of boric acid, among many other materials, as an alternate bond for the magnesium sulfate, but no examples are given.

The composition of the present invention provides a refractory composition suitable for ramming, gunning or casting which has good intermediate temperature strength and can be rammed to high densities.

SUMMARY OF THE INVENTION

It has now been discovered, according to this invention, that a refractory composition having good strength after heating to intermediate temperatures and which can be rammed to densities of 180 lbs per cubic foot (pcf) or higher consists essentially of sized refractory aggregate including at least 10%, based on the total weight of the composition, MgO-containing grain having at least 50% MgO and passing a 100 mesh screen, from 0.1 to 1.5%, on the dehydrated basis, aluminum sulfate, from 0.2 to 1.5% of an organic acid or salt thereof, and up to 1%, expressed as $B_2O_3$, of a boron compound.

DETAILED DESCRIPTION

The refractory aggregate used can be any such material, but preferably will be a nonacid aggregate such as periclase or periclase and chrome ore. In a particularly preferred embodiment of the invention, the refractory aggregate is all periclase containing at least 85%, and preferably about 95% or more, MgO. The aggregate is sized acccording to principles well known in the industry to achieve maximum density, ranging in size from, for example, material just passing a 4 mesh screen down to material passing a 325 mesh screen. About 30%, for example from 20 to 40%, of the aggregate will pass a 100 mesh screen.

At least 10% of the composition, and usually from 20 to 40%, will be aggregate passing a 100 mesh screen and containing at least 50% MgO. This material can be a prereacted magnesiachrome grain containing the requisite amount of MgO, but preferably is periclase containing at least 85%, and preferably about 95% or more, MgO. In a particularly preferred embodiment, all the refractory aggregate is periclase containing about 95% MgO, about 30% of which passes a 100 mesh screen.

The aluminum sulfate ($Al_2(SO_4)_3$) used is a well known material of commerce and is used in the form of a powder, for example substantially all passing a 100 mesh screen. The material can be used in one of its hydrated forms, for example that with 14 waters of hydration ($Al_2(SO_4)_3 \cdot 14.H_2O$). However, the percentages given in the specification and claims refer to the dehydrated material, except that in the examples the weight given is the actual amount of hydrated material.

The organic acid used is a material such as citric acid, succinic acid, maleic acid, and the like. As already indicated, the corresponding salts, for example the sodium salts of these acids, can also be used A preferred class of materials is the citrates, citric acid being particularly preferred. These materials, too, are well known materials of commerce and are used in granular form, for example material substantially all passing a 10 mesh screen.

The boron compound used is also in granular form, for example substantially all −28 mesh, and preferably is a soluble boron compound, for example one of the sodium borates, or, in a particularly preferred embodiment, boric acid ($H_3BO_3$).

The composition is mixed dry and packaged for shipment to the user, who adds the requisite amount of water or other tempering liquid at the time of use. For example, if the material is to be rammed, from about 2 to 5% water will be used, whereas in casting from about 4 to 8% water will be used, depending on the specific sizing of the compositions and its precise composition. In gunning, for example through a gun where water is added to the refractory at the nozzle, from 10 to 20% water will be used. The composition can also be used as a slurry, with up to 30% or more water added, although it is not specifically designed for this application. In addition, the composition can be used to form refractory shapes, for example by pressing, or as a mortar, if desired.

EXAMPLES

Three compositions were made from a sea water periclase sized so that substantially all passed a 6 mesh screen and about 30% passed a 100 mesh screen, and having the following typical chemical composition: 2.1% $SiO_2$, 1.1% $CaO$, 0.4% $Fe_2O_3$, 0.3% $Al_2O_3$, 0.3% $Cr_2O_3$, and (by difference) 95.8% $MgO$. The first composition (A) was bonded with 0.8% hydrated aluminum sulfate ($Al_2(SO_4)_3 \cdot 14H_2O$) and 0.6% citric acid, both percentages being based on the total weight of the composition. The second composition (B) was bonded with 0.8% hydrated aluminum sulfate, 0.6% citric acid and 0.7% boric acid. The third composition (C) was the same as (B) except that 1.04% borax was used instead of the boric acid. The aluminum sulfate was the standard grade supplied by the General Chemical Division of Allied Chemical & Dye Corp. It contains about $14H_2O$, is 100% −30 mesh and 97% −100 mesh.

Pellets formed at 10,000 psi from these three compositions with 3.75% water added had densities, as formed, of 186.4, 186.2, and 186.1 pcf, respectively, and cold crushing strengths after drying at 150°C of 7,382, 9,939, and 8,603 psi, respectively. After heating to 850°C, composition A pellets had a cold crushing strength of 1,088 psi, B of 2,174 psi, and C of 2,631 psi. The hot load failure temperature (under a 25 psi load) of A was 1,700°C, of B 1,600°C, and of C 1,523°C. Rammed blocks of composition B (with 2.75% water), had a formed density of 184.0 pcf, and cast blocks of the same composition (5.5% water) 179.6 pcf after drying.

Compositions A, B and C were subjected to an explosion test wherein they were each mixed with 5.75% water, on the dry basis, cast into one gallon cans, and, after 4 hours of drying at room temperature and 6 hours drying at 150°C, placed in a furnace which was heated to 800°C in 1 hour and to 1,100°C in the second hour. This test has been found to be a very sensitive measure of the tendency of refractory ramming mixes to explode in use during heatup. None of the three compositions exploded during this test.

The preceding examples can be compared with a composition made from the same periclase but bonded with 0.9% chromic acid and 0.7% boric acid, according to the teachings of U.S. Pat. No. 2,702,751. Pellets of this later composition had a formed density of 183.4 pcf, a cold crushing strength of 8,318 psi after drying at 150°C, and of 2,254 psi after heating to 850°C. Its hot load failure temperature was 1,648°C. Thus, it can be seen that the compositions of this invention have properties comparable to those of the prior art composition using the potentially hazardous chromic acid bond. This comparison composition also passed the explosion test described above.

Compositions A, B, and C can also be compared with compositions made from the same periclase but using only a single bonding agent, 0.8% aluminum sulfate ($Al_2(SO_4)_3 \cdot 14H_2O$) in Composition X, 0.67% boric acid in Y, and 0.6% citric acid in Z. These compositions had formed densities of 180.4, 180.9, and 181.6 pcf, respectively, but cold crushing strengths of only 1,883, 698, and 2,813 psi after 150°C drying, and only 814, 810 and 312 psi after heating to 850°C. Thus it is all the more surprising that a combination of these three materials leads to such high intermediate temperature strengths.

Compositions A, B, and C can also be compared with a composition made from the same periclase and bonded with 1% aluminum sulfate and 0.67% boric acid. This composition had a formed density of 180.4 pcf and a cold crushing strength after drying at 150°C of 5,133 psi. After heating to 850°C, the cold crushing strength was 1045 psi.

In the specification and claims, percentages and parts are by weight unless otherwise indicated. Mesh sizes referred to herein are Tyler standard screen sizes which are defined in Chemical Engineer's Handbook, John H. Perry, Editor-in-Chief, Third Edition, 1950, published by McGraw Hill Book Company, at page 963. For example, a 100 mesh screen opening corresponds to 147 microns. Analyses of mineral components are reported in the usual manner, expressed as simple oxides, e.g., $MgO$ and $SiO_2$, although the components may actually be present in various combinations, e.g., as a magnesium silicate.

What is claimed is:

1. A refractory composition consisting essentially of sized refractory aggregate including at least 10%, based on the total weight of the composition, MgO-containing grain having at least 50% MgO and passing a 100 mesh screen, from 0.1 to 1.5%, on the dehydrated basis, aluminum sulfate, from 0.2 to 1.5% of an organic acid or salt thereof, and up to 1%, expressed as $B_2O_3$, of a boron compound.

2. Composition according to claim 1 wherein the aluminum sulfate is hydrated aluminum sulfate, wherein the boron compound is a soluble boron compound, and wherein the organic acid or salt thereof is citric acid or a citrate.

3. Composition according to claim 2 wherein the MgO-containing grain contains at least 85% MgO.

4. Composition according to claim 3 wherein the refractory aggregate is all grain containing at least 85% MgO.

5. Composition according to claim 2 wherein the aluminum sulfate contains 14 waters of hydration.

6. Composition according to claim 5 wherein the MgO-containing grain contains at least 85% MgO.

7. Composition according to claim 6 wherein all the refractory aggregate is grain containing at least 85% MgO.

8. Composition according to claim 2 wherein the boron compound is boric acid or borax.

9. Composition according to claim 8 wherein the MgO-containing grain contains at least 85% MgO.

10. Composition according to claim 9 wherein all the refractory aggregate is grain containing at least 85% MgO.

11. Composition according to claim 5 wherein the boron compound is boric acid or borax.

12. Composition according to claim 11 wherein the MgO-containing grain contains at least 85% MgO.

13. Composition according to claim 12 wherein all the refractory aggregate is grain containing at least 85% MgO.

14. Composition according to claim 11 wherein the citric acid or citrate is citric acid.

15. Composition according to claim 14 wherein the MgO-containing grain contains at least 85% MgO.

16. Composition according to claim 15 wherein all the refractory aggregate is grain containing at least 85% MgO.

17. Composition according to claim 11 wherein the boron compound is boric acid.

18. Composition according to claim 17 wherein the MgO-containing grain contains at least 85% MgO.

19. Composition according to claim 18 wherein all the refractory aggregate is grain containing at least 85% MgO.

20. Composition according to claim 17 wherein the citric acid or citrate is citric acid.

21. Composition according to claim 20 wherein the MgO-containing grain contains at least 85% MgO.

22. Composition according to claim 21 wherein all the refractory aggregate is grain containing 85% MgO.

23. Composition according to claim 22 containing 0.8% $Al_2(SO_4)_3 \cdot 14H_2O$, 0.7% boric acid, and 0.6% citric acid.

* * * * *